No. 788,293. PATENTED APR. 25, 1905.
J. B. WALKER.
AUTOMATIC PIANO PLAYER.
APPLICATION FILED JUNE 13, 1904.

WITNESSES:
A. H. Hopkins
W. B. Kaempffert

INVENTOR
John B. Walker
BY
ATTORNEYS

No. 788,293. PATENTED APR. 25, 1905.
J. B. WALKER.
AUTOMATIC PIANO PLAYER.
APPLICATION FILED JUNE 13, 1904.

WITNESSES:
INVENTOR
John B. Walker
BY
ATTORNEYS

No. 788,293.                                    Patented April 25, 1905.

UNITED STATES PATENT OFFICE.

JOHN B. WALKER, OF NEW YORK, N. Y.

AUTOMATIC PIANO-PLAYER.

SPECIFICATION forming part of Letters Patent No. 788,293, dated April 25, 1905.

Application filed June 13, 1904. Serial No. 212,264.

*To all whom it may concern:*

Be it known that I, JOHN B. WALKER, a citizen of the United States, and a resident of the city of New York, borough of Manhattan, in the county and State of New York, have invented a new and useful Improvement in Automatic Piano-Players, of which the following is a full, clear, and exact description.

My invention is an improvement upon the one described in my patent application, Serial No. 197,148, now pending before the Patent Office.

Reference is to be had to the accompanying drawings, forming a part of this specification, in which similar characters of reference indicate corresponding parts in all the figures.

It is desirable in the rendering of music that the theme, air, melody, or other desired portions of the music be played with a different degree of intensity or expression from the accompaniment or remainder of the music, and it is also desirable that the operator should be able simultaneously to vary at will while he is playing the music the relative intensity of tone of the theme and accompaniment. Not only should he be able to vary the relative strength of tone of the theme and accompaniment, but to secure the best effects he should be able to vary the strength of tone of the whole series of theme notes as such and of the whole series of accompaniment notes as such independently at will while he is playing the music, playing the accompaniment softly while he is playing the theme more loudly, or vice versa. In the present application I achieve these ends as follows: I employ, preferably, a single tracker-board and a single set of primary and secondary pneumatics, as in the ordinary piano-player, and coacting with this I also provide for each secondary pneumatic a separate pneumatic switching-valve controllable from a pneumatic-switching board, said switching-board being common to all the secondary pneumatics for the purpose of connecting the main striking-pneumatic with one of two separate exhaust-boxes whose tension or degree of exhaust is controllable at will by the operator during the playing of the music by means of two separate manually-controlled expression-boxes.

A further object of my invention is to provide an improved mechanism for the joint control of the tempo and the theme-expression box by means of a single manually-operated hand-lever.

A further improvement covered by my invention consists in the provision of means for securing proper tracking of the perforated paper.

Figure 1:
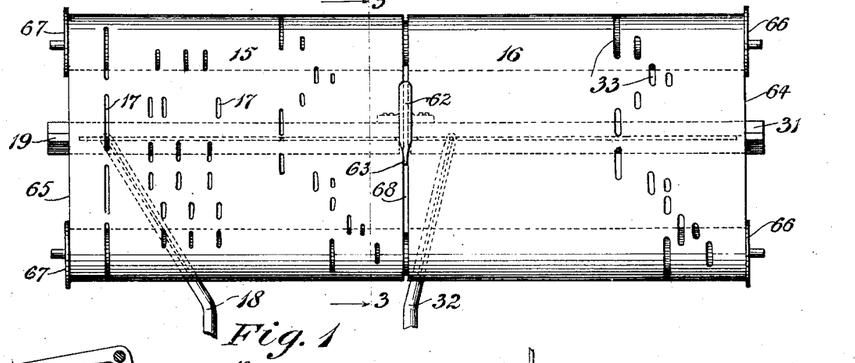
Figure 1 is a front view of the two perforated sheets, shown in position, respectively, over the tracker-board and the pneumatic-switching board, viewed in the direction indicated by arrow 1, Fig. 3.
Figure 2:
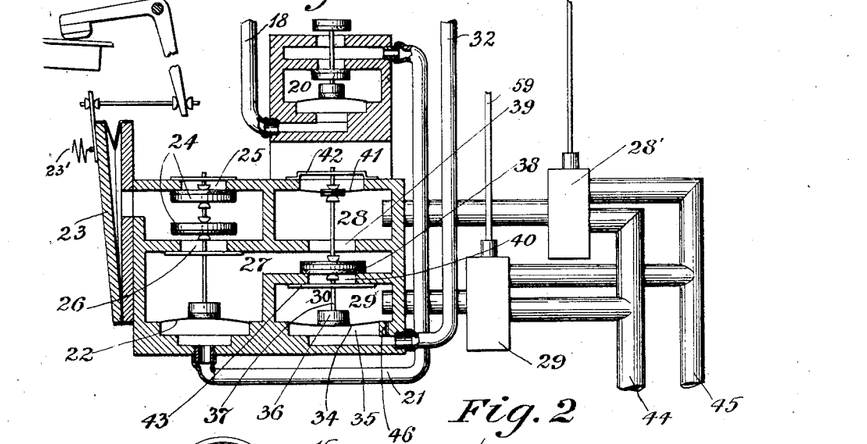
Fig. 2 is a vertical section showing the pneumatics and valve mechanism and the pneumatic-switch with the switch in the normal position.
Figure 4:
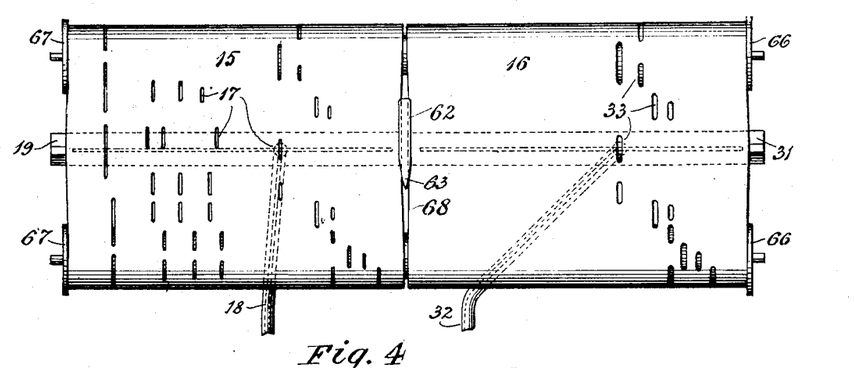
Fig. 4 is a view similar to Fig. 1, showing the manner of admitting air through the switching-board perforations for the purpose of actuating my pneumatic-switch and also showing the particular function of my improved tracker-guide for the perforated paper.
Figure 5:
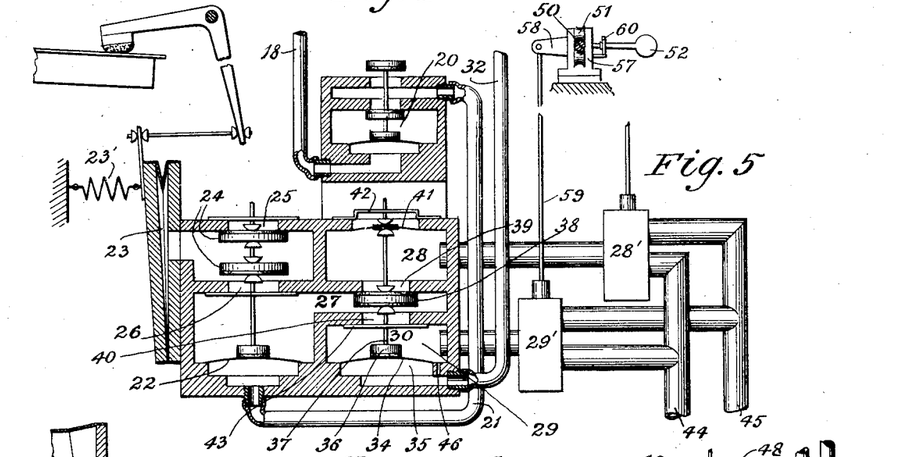
Fig. 5 is a section similar to Fig. 2, showing the switch in its raised position for playing a theme note.
Figure 8:
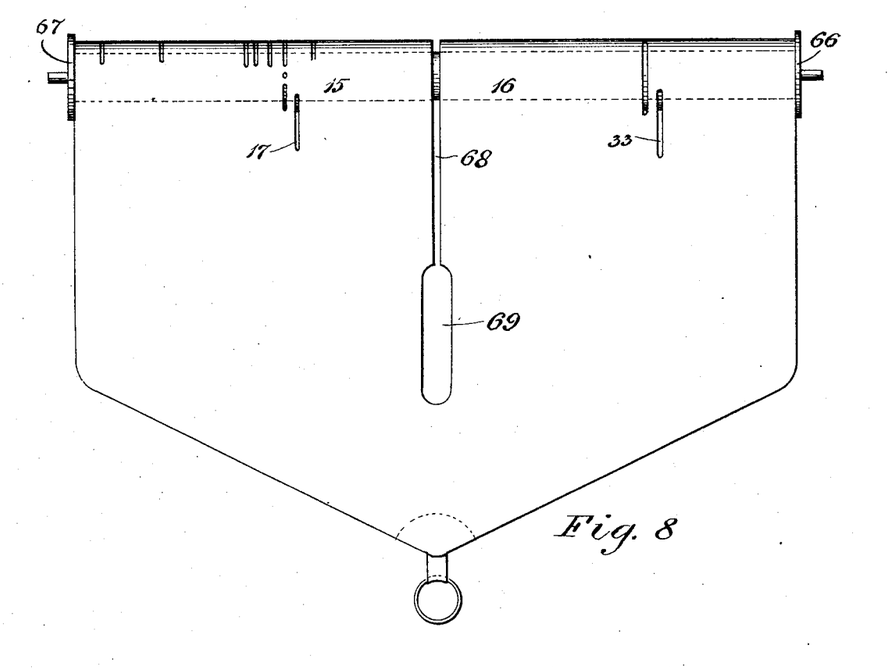
Fig. 8 is a view of my combined music-sheet and pneumatic-switch-controlling sheet.
Figure 10:
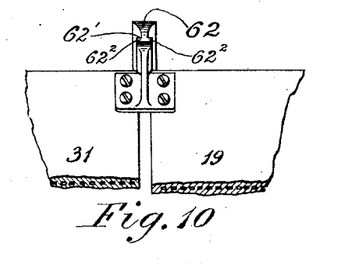
Fig. 10 is a rear view showing the tracker-guide in position between the tracker-board and the switching-board.

In the drawings, 15, Figs. 1, 4, and 8, represents my perforated music-sheet, and 16 represents the pneumatic-switch-controlling sheet, which two sheets in order to insure equal lengthwise expansion and contraction of the sheets and proper relative transverse alinement of the perforations are preferably cut from the same sheet of paper. The music-sheet 15 is provided with the perforations 17, which register with the ducts 18 in the tracker-board 19, there being as many ducts as there are keys on the keyboard of the piano. The music-sheet, tracker-board, and ducts are of the usual well-known construction. Each duct 18 leads to a primary pneumatic 20, which in turn is connected by a duct 21 with a secondary pneumatic 22, which in turn controls a main or striking pneumatic 23 in the manner hereinafter described. The secondary pneumatic comprises a double valve 24, which normally when the corresponding duct 18 is covered by the paper uncovers a port 25, leading to the atmosphere, and maintains said main pneumatic in the inflated condition through the coacting of a spring 23'. When, however, said duct 18 is uncovered by the passage of a perforation 17 in the music-sheet 15, the pneumatic 22 will be actuated to lift the double valve 24, closing port 25 and connecting the main pneumatic through the port 26 with a passage 27. Said passage 27 may be opened to either of two exhaust-boxes 28 or 29 by the operation of the pneumatic-switch 30. The tension in said exhaust-boxes 28 and 29 may be separately controlled at the will of the operator during the playing of the music by means of manually-controlled expression-boxes 28' and 29', which are respectively inserted between exhaust-boxes 28 and 29 and the exhaust-pipes 44 and 45, which lead to the regulating-bellows of the main exhaust-chamber of the piano-player. I do not claim any particular form for the construction of the expression-boxes, regulating-bellows, and main exhaust-chamber, all of which may be of any approved construction common to the art. For the operation of the said pneumatic-switches 30 I provide a pneumatic-switching board 31, provided with ducts 32, which register with perforations 33 in the pneumatic-switch-controlling sheet 16, said ducts 32 leading directly to the said pneumatic-switches 30. These perforations 33 correspond in their relative positions on their own sheet 16 to the positions of the theme perforations on the adjoining music-sheet 15, except that in transverse alinement they are cut slightly ahead of the latter. The pneumatic-switch 30 comprises a diaphragm 34 of flexible material, which covers a chamber 35, into which the duct 32 opens. Resting on said diaphragm 34 is a pad 36, which is attached to the lower end of a valve-stem 37, which valve-stem carries a valve 38, lying within the passage 27 and arranged to close by its vertical movement either of two ports 39 and 40, which open, respectively, to the exhaust-boxes 28 and 29. The upper end of the valve-stem 37 passes through and is hermetically attached to a flexible diaphragm 41. Suitable guide-strips 42 and 43 are provided to hold the valve-stem in a vertical position to insure the proper seating of the valve 38. A small vent 46 connects the exhaust-box 29 in the usual manner with the chamber 35, so as to produce an exhaust therein, while the duct 32 is closed at the switching-board 31 by the pneumatic-switch-controlling sheet 16. Normally, as shown in Fig. 2, the valve 38 occupies its lower position, uncovering port 39 and connecting the passage 27 with the exhaust-box 28, this being the condition when an accompaniment note is played under the control of the accompaniment-expression box 28'. When, however, a theme note is to be played, the perforation 33 in the pneumatic-switch-controlling sheet 16 uncovers a duct 32, as shown in Fig. 4, and the exhaust in duct 32 is destroyed by the admission of air at atmospheric pressure therein. This causes the diaphragm 34 to flex upwardly, as shown in Fig. 5, closing port 39, Fig. 5, and opening port 40, thereby connecting passage 27 with the exhaust-box 29. When the duct 32 is closed at the switching-board, the air in said duct 32 is exhausted through the vent 46, and the atmospheric pressure on the upper diaphragm 41 causes the pneumatic-switch to drop to its normal position. It should be noted that the upper diaphragm 41 is made sufficiently smaller than the lower diaphragm 34 to insure that whenever on the uncovering of a duct 32 by the paper atmospheric pressure is allowed to act upon both diaphragms there will be an excess of pressure upwardly to lift the pneumatic-switch.

Figure 6:
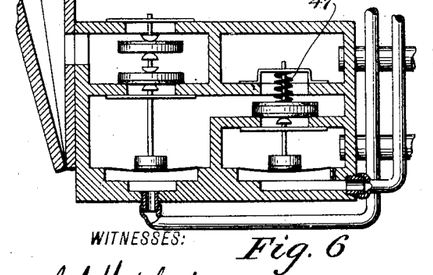
Figs. 6 and 7 are fragmentary sections similar to Fig. 2, showing modifications of my pneumatic-switch.
Figure 7:
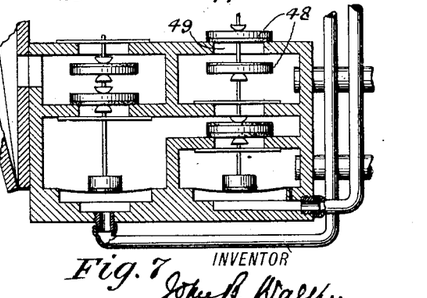

It will be seen from the above description that the upper diaphragm 41 acts as a pneumatic-spring to lower the pneumatic-switch whenever the duct 32 is closed. While I prefer this form of construction, I show two modifications thereof in Figs. 6 and 7. In Fig. 6 a metal spring 47 takes the place of diaphragm 41, and in the modification shown in Fig. 7 the same effect is produced by means of a double valve 48 acting upon opposite sides of a port 49.

Figure 12:
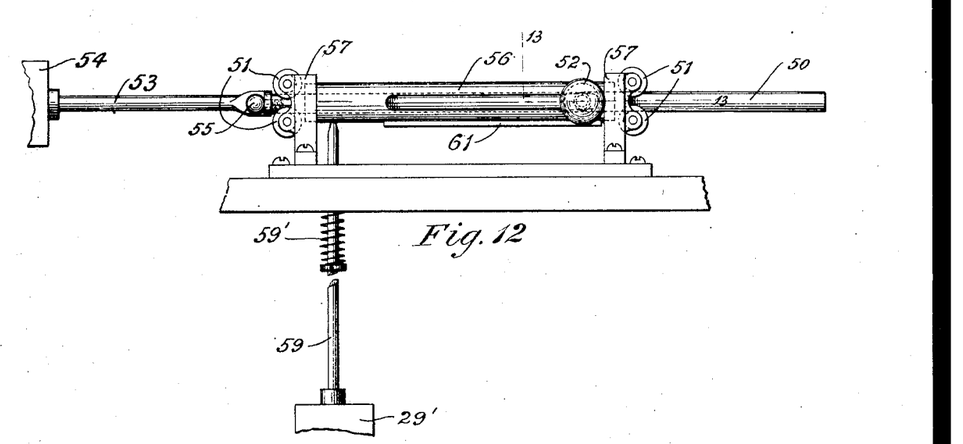
Fig. 12 is a front elevation of my device for the simultaneous manual control of the theme expression and the tempo of the music during the operation of the piano-player.
Figure 13:
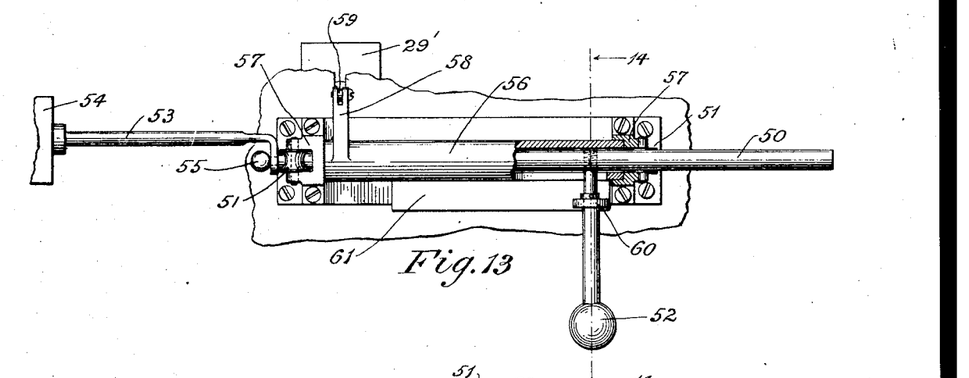
Fig. 13 is a plan view of Fig. 12, partly broken away on line 13 13 of Fig. 12 to show detail.
Figure 14:
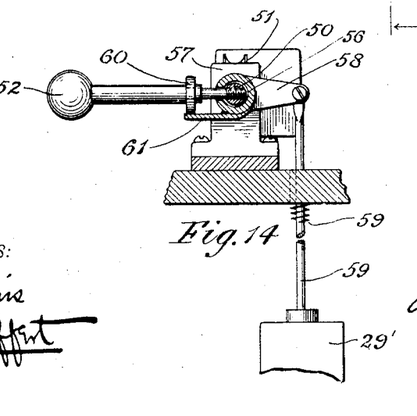
Fig. 14 is a vertical section through Fig. 13 on line 14 14 looking in the direction of the arrow.

To avoid the complication of parts due to the use of two expression-boxes, I find it desirable to couple up the control of one of these expression-boxes with the control of the tempo-box in a single manually-operated lever. Preferably I couple up the theme-expression-control with the tempo control and arrange the mechanism thus provided to be actuated, preferably, with the right hand, since it is this hand that usually plays the theme, air, or melody in ordinary piano-playing by hand. The construction of this particular mechanism herewith shown is an improvement over the form disclosed in my application, Serial No. 197,148. I find that it is desirable to reduce the pressure and friction of the wearing parts of this mechanism to a minimum if it is to have that freedom and quickness of movement so essential to the proper control of the tempo and expression of piano-playing. To accomplish the desired results, I introduce roller-bearings in many of the wearing-surfaces, particularly those that have a sliding movement. In the mechanism here shown I provide a horizontal shaft 50 capable of two independent movements, one being a lateral movement in the general longitudinal direction of its axis, the other being a rocking movement upon its axis, both movements being guided by pairs of roller-bearings 51, Figs. 12, 13, and 14. This shaft is moved by a hand-lever 52, which is rigidly attached to the same. The valve-stem 53 of the tempo-box 54 is loosely connected with one end of the shaft 50 by a screw 55, which passes loosely through an eye formed in the end of said valve-stem 53 and is threaded into the end of the shaft 50. For the operation of the theme-expression box I provide a long sleeve or tube 56, inclosing but not bearing upon shaft 50, said tube having a rocking movement in bearings formed in the brackets 57, upon which brackets are also carried the rollers 51. This sleeve 56 is slotted longitudinally to admit the hand-lever 52, the slot being of sufficient width to permit said hand-lever to move horizontally within it without contact with the edges of said slot. A crank-arm 58, formed on one end of said sleeve 56, is pivotally connected at its outer end to the valve-stem 59 of the theme-expression box 29'. Said crank-arm 58 is normally held in its lowest position by a compression-spring 59' acting on the valve-stem 59. At a suitable distance from the shaft 50 I mount loosely upon hand-lever 52 a roller or wheel 60, which runs upon said hand-lever and has a rolling bearing upon a plate 61, formed integrally with the sleeve 56. It will be evident from this description that the theme-expression box 29' is operated by the vertical rocking movement of the hand-lever 52 and that the tempo-box 54 is operated by the horizontal movement of the same lever, and, further, that both the tempo-box and the expression-box may by my mechanism be operated simultaneously.

The increased width of perforated paper that may be found desirable in the use of my invention exaggerates the difficulties of correct tracking or registering of the perforations over their respective ducts, these difficulties, as is well known in the practice of the art, being due to the expansion and contraction of the paper under changes of temperature and variations of the hydroscopic condition of the atmosphere. It becomes specially desirable for the successful operation of my invention to overcome this difficulty. The present practice adopted to secure proper tracking or registering of the perforations over the ducts is to cut the paper of slightly less width than the distance between the flanges of the rolls which carry the paper, and an effort is made to cause the paper to bear continually against the flanges on one side, leaving the lateral movement due to the expansion of the paper to take place from that side toward the opposite edge of the paper. Consequently there is an accumulated expansion movement toward the unguided or opposite edge of the paper, with a consequent increased risk of the perforations toward that side of the paper not registering properly with their ducts. Moreover, it is difficult to make the paper track always with the flanges on the same side, the paper tending to move sometimes to one side, sometimes to the other side. Not only must allowance be made for expansion and contraction, but the paper must be cut so as to have a clearance when in its most expanded condition. Now these difficulties would tend to be increased on the greater width of paper which is found necessary to cover both my tracker-board and my pneumatic-switching board. I overcome this difficulty by my improved tracker-guide 62, Figs. 1, 4, 3, 9, 10, 11, which guides the paper from the center instead of from one edge.

Figure 11:
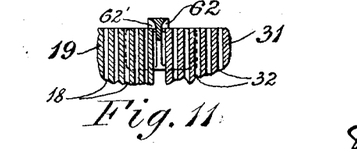
Fig. 11 is a section on line 11 11, Fig. 3.

In carrying out this improvement I make the distance between the flanges 66 and 67 of the rolls approximately equal to the width of the paper when the latter is dry, and consequently shrunk to its narrowest dimensions. I then cut a slot 68 lengthwise through the center of the paper, the width of said slot being equal to the width of the tracker-guide 62 at the point 62', Figs. 9, 10, 11. It will be evident that as the paper expands under atmospheric changes the movement laterally will take place on the rolls from the flanges toward the center, slightly closing the slot 68. The tracker-guide, which is preferably of metal and of the general V-shape cross-section indicated in Fig. 11, is attached, as shown, between the tracker-board 19 and the pneumatic-switching board 31, and it is so adjusted that its narrowest width at point 62' is found at the level of the top face of the tracker-board and the pneumatic-switching board. The first two or three inches of the paper-slot 68 is cut of a greater width than the rest of the slot, as shown at 69, Fig. 8, to enable the tracker-guide to be threaded into the slot as the paper is drawn forward in placing the latter in position for playing. As the paper travels forward the upper flanges of the V-shaped tracker-guide overlap the edges of the paper-slot 68 and tend to keep the paper down snugly upon the tracker-broad and switching-board. The paper is prevented from curling over and downward at the slot and is kept perfectly true and flat as it reaches the tracker-board by the action of the lower flanges $62^2$ of the tracker-guide. Preferably I place my two paper-rolls farther from the tracker-board than is usual in piano-players.

I have shown above that the expansion of the paper slightly closes the longitudinal central slot in said paper, and, this being the case, when the paper is wound from one roll to the other over the tracker-board and switching-board the edges of the slot in the paper will tend to be gently crowded against the narrowest part of the tracker-guide at the point 62', which, as stated above, is exactly equal to the width of the said central slot as cut in the paper. It will be seen that by this arrangement the paper will always be guided across the tracker-board and the switching-board from the center of said paper and that consequently the lateral displacement of the paper with reference to any particular duct for a given total width of paper will be just one-half as much as it is under the methods heretofore used. Conversely, in rerolling the central tracker-guide will tend gently to crowd the paper outwardly, so that it will roll up snugly against the outer flanges of the music-roll. This action is shown in a greatly-exaggerated form in Fig. 4.

Figures 3, 9:
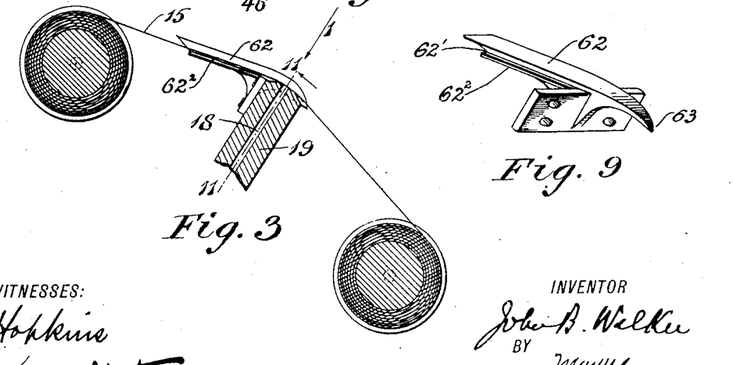
Fig. 3 is a section taken on the line 3 3, Fig. 1.
Fig. 9 is a perspective view of my tracker-guide.

The tracker-guide is formed with its forward end 63, Fig. 9, tapered and curved downwardly to insure that in rerolling said tracker-guide shall automatically and freely disengage the paper when the enlarged end 69 of the center slot 68 is reached.

While I prefer to employ paper divided into halves, except at its ends, as above described, I do not limit myself in all instances to this construction, as obviously the paper may have many other forms without departing from the spirit of my invention.

As shown above, each striking-pneumatic 23 is normally operated by one box 28 of two exhaust-boxes, which is preferably called the "accompaniment-box;" but the striking-pneumatic may be connected to the other box 29 of said exhaust-boxes, preferably known as the "theme-box," by the operation of a pneumatic-switch 30, which is raised by the passage of a corresponding perforation 33, Fig. 4, in the pneumatic-switch-controlling sheet. In cutting my perforated paper I provide for every note of the air, theme, and other parts of the music which are to be separately controlled a corresponding perforation in the pneumatic-switch-controlling sheet which will throw the corresponding striking-pneumatic onto the separate or theme exhaust-box 29 and will permit of the separate control of its exhaust by the operator during playing, who can thereby play said theme note with any degree of intensity desired. It will be observed, furthermore, that where a number of theme notes of the same pitch are to be successively struck a single long perforation may be used in my pneumatic-switch-controlling sheet for the purpose of keeping the corresponding striking-pneumatic under control of the theme-expression box as long as said series of theme notes of the same pitch are being played.

Preferably the perforations in the pneumatic-switch-controlling sheet are cut slightly in advance of the corresponding perforations in the sheet-music, so as to insure the action of the pneumatic-switch before the main pneumatic is operated by the passage of the corresponding music-sheet perforation over the tracker-board.

I wish it to be understood clearly throughout the above specification and in the drawings that I show and describe merely a single main pneumatic and its accessory set of primary and secondary pneumatics and its switching-valve, all coacting for the striking of one key of the piano. In a complete piano-player constructed according to my invention there are as many such sets of pneumatic mechanisms as there are keys to be played by any player on a piano-keyboard. The two auxiliary exhaust-boxes 28 and 29 and their respective exhaust-boxes 28' and 29' are common to the whole of such sets of pneumatic mechanisms above described. I do not, however, wish to limit the application of the devices covered by my claims exclusively to a piano-player employing both primary and secondary pneumatics, as the principles of my invention are to some extent applicable to the simpler and cheaper machines.

Having thus described my invention, I claim as new and desire to secure by Letters Patent—

1. The combination of a perforated music-sheet containing all the perforations for the music to be played, a tracker-board, ducts, primary pneumatics, secondary pneumatics controlling main pneumatics, separate and independent theme and accompaniment exhaust boxes, separate theme and accompaniment expression boxes, with a pneumatic-switching sheet, adapted to travel simultaneously with and at the same speed as said music-sheet, said pneumatic-switching sheet containing perforations corresponding to the theme and other selected notes of the said music-sheet that are to be played with separate expression from the rest of the said music on said music-sheet, a switching-board and pneumatic connections therefrom to the flexible diaphragms of a plurality of pneumatic-switches, for the purpose of switching said main pneumatics into the control of said theme-expression box for the purpose of playing said theme notes with independent expression.

2. The combination of a music-sheet and a pneumatic-switching sheet, adapted to roll and unroll side by side on the same pair of rollers, said sheets being separated by a slot of predetermined, normal width, with a tracker-board, a pneumatic-switching board, and a tracker-guide of the same width as said slot, when said slot is of its normal width, said tracker-guide being located centrally between said tracker-board and said switching-board, for the purpose of guiding said sheets by bearing against their inner edges.

3. The combination of a sheet of perforated paper for playing music, divided centrally throughout its length by a slot of uniform width, a tracker-board, a switching-board, both provided with ducts, and a V-shaped tracker-guide of the same width as said slot, with a pair of music-sheet rollers, having flanges at their outer ends, the width between said flanges being approximately equal to the normal width of said paper, and said flanges coacting with said tracker-guide to guide said paper across said tracker-board and switching-board, so that the inner edges of said slot shall always bear against the narrowest point of said tracker-guide, for the purposes specified.

4. The combination of striking mechanism for depressing a key, a main pneumatic connected with said striking mechanism, a secondary pneumatic and a puppet-valve connected together for controlling said main pneumatic, a pair of separate exhaust-boxes independently controlled by separate expression-boxes, and mechanism for making and breaking pneumatic communication between said main pneumatic and each of said exhaust-boxes.

5. The combination of a main exhaust-chest, a pair of exhaust-boxes independent of each other, a pair of expression-boxes interposed between said main exhaust-chest and said exhaust-boxes, said expression-boxes being independent of each other and adapted respectively to control different groups of related notes in a composition, a pneumatic-switch connected with both of said exhaust-boxes and adapted to throw either of said expression-boxes into action and the other of said expression-boxes out of action relatively to the striking of a single key, means for actuating said switch, and pneumatic mechanism controllable by said switch for striking said single key.

6. The combination of a main exhaust-chest, a pair of exhaust-boxes, a pair of expression-boxes interposed between said main exhaust-chest and said exhaust-boxes, said expression-boxes being independent of each other, a single switch common to both of said exhaust-boxes, and pneumatically-operated mechanism for striking a single key, said pneumatically-operated mechanism being so disposed as to communicate with either one or other of said exhaust-boxes, according to the position of said switch, and means for actuating said switch.

7. The combination of a tracker-board provided with ducts for admitting the air, a longitudinal sheet engaging said tracker-board and provided with perforations adapted to register with said ducts, a guide member engaging said sheet intermediate of the outer edges thereof, so as to guide said sheet from its approximate center, and means for moving said sheet relatively to said tracker-board.

8. The combination of mechanism provided with a plurality of ducts for admitting air, a sheet movable relatively to said mechanism and provided with perforations adapted to register with said ducts, a guide engaging said sheet at its approximate center for the purpose of subdividing inequalities in the width of said sheet, thus reducing the inequalities of registration, laterally of said perforations with said ducts, and means for actuating said sheet.

9. The combination of a tracker-board and a switchboard, each provided with ducts, a tracker-guide located intermediate of said tracker-board and said switching-board, a perforated sheet divided into separate members one engaging said tracker-board and the other engaging said switching-board, the inside adjoining edges of said separate members being free to engage said tracker-guide, means for actuating said perforated sheet, and pneumatic mechanism connected with said ducts and controllable thereby for actuating a musical instrument.

10. The combination of a shaft movable in the direction of the length of its axis, also adapted to rock in a plane crossing said axis, a tempo-control device and an expression-box connected in operative relation with said shaft and actuated independently and respectively by the respective endwise and rocking movements thereof, antifriction-bearings so engaging said shaft, so as to permit said movements to take place, and means for actuating said shaft.

11. The combination of a shaft movable in the direction of the length of its axis and also adapted to rock in a plane crossing said axis, a tempo-control and an expression-box connected in operative relation with said shaft and actuated independently and respectively by the respective endwise and rocking movement thereof, a member for supporting the bearings of said shaft, rollers mounted upon said member and engaging said shaft, said rollers being so positioned relatively to said shaft as to facilitate both the longitudinal and rocking movements thereof, and revoluble upon axes crossing the length of said shaft, and means for actuating said shaft.

12. The combination of a main pneumatic for striking a note, a pair of exhaust-boxes independent of each other, a pneumatic-switching valve for connecting said main pneumatic with either of said exhaust-boxes, a switching-board provided with a duct for supplying air to said pneumatic-switching valve, a tracker-board provided with a duct corresponding to said main pneumatic, and a music-sheet provided with perforations for registering with said ducts respectively, the perforation for registering with the duct in said switching-board being slightly in advance of the other perforation, so as to actuate said switch before said main pneumatic is operated.

13. The combination of a main pneumatic, a closed member connected therewith and provided with an air-passage, a pair of exhaust-boxes adapted to exert air-pressures independently of each other, and provided respectively with ports opening into said air-passage, a secondary pneumatic and a puppet-valve connected together and adapted to open and close communication between said main pneumatic and said air-passage, means for closing said ports alternately, and separate expression-boxes connected with said exhaust-boxes respectively.

14. The combination of a main pneumatic, a closed member connected therewith, and provided with an air-passage, a pair of exhaust-boxes adapted to exert air-pressures independently of each other and provided respectively with ports opening into said air-passage, separate expression-boxes connected with said exhaust-boxes, a secondary pneumatic and a puppet-valve connected together and adapted to open and close communication between said main pneumatic and said closed member, a single puppet-valve for closing said ports alternately, and a pair of pneumatic-diaphragms of unequal areas and actuated by differential air-pressures, for moving said last-mentioned puppet-valves.

15. The combination of a pair of independent exhaust-boxes, a pair of manually-operated expression-boxes, independent of each other, for regulating the exhaust in the said exhaust-boxes respectively, a pneumatic-switching valve for connecting either of said exhaust-boxes with a common air-passage, and a main pneumatic adapted to be connected with said common air-passage for striking a note.

16. The combination of a perforated sheet containing as many perforations as there are theme notes and other selected notes of a musical composition to be played under separate manual control of their expression, a pneumatic-switching board, a plurality of ducts leading therefrom to a plurality of pneumatic-switches, one for each key of the piano, main pneumatics, and two independent exhaust-boxes each independently capable of being varied in tension from high to low tension as desired, means for varying said tension, and means for connecting said exhaust-boxes with said main pneumatics, and of disconnecting them therefrom by the operation of said pneumatic-switches.

17. The combination of a perforated sheet for playing music with a roller provided with flanges adapted to guide the outer edges of said sheet, a central longitudinal slot in said sheet, and a tracker guide or strip adapted to engage said central, longitudinal slot in said sheet, so that said sheet may be guided at its outer edges at said roller and at its center at said tracker-guide, said sheet being free, in expanding, to move on said roller from its outer edges toward its center, tending to close the center slot, and at said tracker-guide to expand from its center toward its outer edges for the purposes specified.

18. The combination of a music-sheet and a tracker-board, arranged for playing all the notes of a musical composition, with a pneumatic-switching sheet, a separate switching-board, a separate manually-controlled expression-box, and means, controllable from said switching-board, for playing the theme notes and other selected notes of said composition under the control of said separate manually-controlled expression-box.

19. The combination with a tempo device and an expression-box, of a shaft movable in the direction of its axis for the control of said tempo device, and adapted to rock in a plane crossing said axis for the control of said expression-box, mechanisms connecting said shaft with said tempo device and with said expression-box, and two pairs of roller-bearings, one pair at each end of said shaft, on which said shaft may move freely in its longitudinal movement and in which it may turn freely in its rocking movement.

20. In a piano-player, the combination of a mechanism for the joint manual control of the tempo and expression of said piano-player, said mechanism comprising a rock-shaft free to move in the horizontal direction of its axis and to rock in a vertical plane crossing said axis, with a hollow shaft, concentric with and inclosing, but not touching said rock-shaft, and having bearings at its end, said bearings permitting of a rocking movement of said hollow shaft in unison with said rock-shaft.

21. In a piano-player, the combination of a mechanism for the joint manual control of the tempo and expression of the said piano-player, said mechanism consisting of a central rock-shaft, a hollow shaft inclosing but not touching the same, a crank-arm mounted upon said hollow shaft, a horizontal bearing-plate, formed integrally with said hollow shaft, a hand-lever passing through a horizontal slot in said hollow shaft, and attached rigidly to said central rock-shaft, and provided with a loose roller-wheel, adapted to bear upon the said bearing-plate, and by the downward and upward movement of said hand-lever to cause said hollow shaft to rock for the purpose of rocking said crank-arm.

22. The combination of two expression-boxes and two exhaust-boxes, adapted respectively to control theme notes and accompaniment notes distinctively as such, a single pneumatic-switch common to both of said exhaust-boxes and adapted to throw the same into action alternately and out of action alternately, with reference to a particular key to be struck, and mechanism controllable by said switch, for striking said particular key so as to sound either a theme note or an accompaniment note, according to the condition of said switch at the moment when said key is struck.

23. The combination of main pneumatic for striking a note, a pair of exhaust-boxes independent of each other, and each capable of being given a variable tension independently of the other at the will of the operator during playing, means for varying such tension, a pneumatic-switching valve for connecting said main pneumatic for either of said exhaust-boxes, mechanism provided with a duct corresponding to said main pneumatic and with a duct for controlling said pneumatic-switch, and a music-sheet provided with perforations for registering with said ducts respectively for admitting air thereto.

24. The combination with a tempo device and a volume-of-sound-expression box, of a horizontal rock-shaft, a manually-operated lever rigidly attached thereto and capable of moving said shaft in the direction of its axis, with a concentric hollow rock-shaft, inclosing but not touching said first-mentioned rock-shaft, a roller carried on said lever, said hollow rock-shaft being provided with a crank-arm and with a horizontal bearing-plate upon which said manually-operated lever may bear and roll by means of said roller carried on said lever, for the purpose of rocking said crank-arm on said hollow rock-shaft, and connections from said first-named shaft to said tempo-control device, and from said hollow shaft to said volume-of-sound-expression box, for the purpose of operating the same respectively and simultaneously.

25. The combination of a pair of independent exhaust-boxes, a pair of manually-operated expression-boxes, independent of each other, for regulating the exhaust in said exhaust-boxes respectively, a main pneumatic, and means for simultaneously making communication between said main pneumatic and one of said exhaust-boxes together with its expression-box, and breaking communication between said main pneumatic and the other of said exhaust-boxes together with its expression-box.

26. The combination of striking mechanism for sounding a note, a main pneumatic for actuating said striking mechanism, a secondary pneumatic for governing said main pneumatic, a pair of separate expression-boxes connected with said main pneumatic and controllable independently of each other for varying the expression of said note, and means for making and breaking communication between said main pneumatic and each of said expression-boxes for the purposes specified.

27. The combination of striking mechanism for sounding a note, a main pneumatic for actuating said striking mechanism, a secondary pneumatic for governing said main pneumatic, a pair of manually-operated expression-boxes, connected with said main pneumatic and controllable independently of each other while the device is in action for varying the expression of said note, valve mechanism for making and breaking communication between said main pneumatic and each of said expression-boxes, and means for automatically actuating said valve mechanism.

28. The combination of a music-sheet containing as many perforations as there are notes to be played in a musical composition, a tracker-board, ducts leading therefrom to primary pneumatics, secondary pneumatics, puppet-valves operated by said secondary pneumatics, striking-pneumatics, air-passages leading from said striking-pneumatics through said puppet-valves to a pair of exhaust-boxes, each member of the pair being independently capable of being varied in tension from high to low tension, as desired, means for varying said tension, and pneumatically-operated switching-valves, for connecting said air-passages and said main pneumatics with one or other of said exhaust-boxes.

29. In a piano-player, the combination of a perforated music-sheet, containing perforations for all the music to be played, a set of ducts, primary pneumatics, secondary pneumatics, and main pneumatics, for each key of the keyboard, an exhaust-chamber preferably known as the accompaniment exhaust-chamber, a manually-operated expression-box for controlling said exhaust-chamber, said separate pneumatic mechanisms being normally operated in combination with said exhaust-chamber, with a second and independent exhaust-chamber, a pneumatic-switching board, and a pneumatic-switch controlled from said pneumatic switching board and capable of cutting out the accompaniment exhaust-chamber and cutting in the second exhaust-chamber, preferably known as the theme exhaust-chamber, whenever theme notes or other selected notes are to be played.

30. The combination of striking mechanism for sounding a note, a main pneumatic for actuating said striking mechanism, a secondary pneumatic and a valve connected together for governing said main pneumatic, a plurality of separate mechanisms including separate expression-boxes controllable independently while the device is in action, and each in turn adapted to control said main pneumatic when in communication therewith, for the purpose of controlling the expression of said note independently of the position thereof in the musical scale, and means for making and breaking communication between said main pneumatic and each of said separate mechanisms.

In testimony whereof I have signed my name to this specification in the presence of two subscribing witnesses.

JOHN B. WALKER.

Witnesses:
  WALTON HARRISON,
  ALFRED H. DAVIS.